US008143356B2

(12) United States Patent
Ogawa et al.

(10) Patent No.: US 8,143,356 B2
(45) Date of Patent: Mar. 27, 2012

(54) POLYESTER RESIN COMPOSITION, PROCESS FOR PRODUCING THE SAME AND MOLDING THEREOF

(75) Inventors: Takeshi Ogawa, Yokkaichi (JP); Motohiro Munakata, Yokkaichi (JP); Toshio Kambe, Yokkaichi (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 11/577,596

(22) PCT Filed: Dec. 12, 2005

(86) PCT No.: PCT/JP2005/022806
§ 371 (c)(1),
(2), (4) Date: Apr. 20, 2007

(87) PCT Pub. No.: WO2006/064773
PCT Pub. Date: Jun. 22, 2006

(65) Prior Publication Data
US 2007/0265383 A1 Nov. 15, 2007

(30) Foreign Application Priority Data

Dec. 13, 2004 (JP) ................................. 2004-360484

(51) Int. Cl.
*C08G 63/85* (2006.01)
(52) U.S. Cl. ........ 525/444; 528/180; 528/275; 528/279; 528/283; 528/286
(58) Field of Classification Search .................. 525/444; 528/180, 275, 279, 283, 286
See application file for complete search history.

(56) References Cited

U.S. PATENT DOCUMENTS

| | | | | |
|---|---|---|---|---|
| 4,551,368 A | * | 11/1985 | Smith et al. .................. | 428/36.6 |
| 6,020,421 A | * | 2/2000 | Fukushima et al. .......... | 524/710 |
| 6,392,005 B1 | * | 5/2002 | Jen .................................. | 528/287 |
| 2002/0193533 A1 | | 12/2002 | Kamo et al. | |
| 2004/0054019 A1 | * | 3/2004 | Ishihara et al. ................. | 521/48 |

FOREIGN PATENT DOCUMENTS

| | | |
|---|---|---|
| EP | 0 921 442 A1 | 6/1999 |
| EP | 1 050 782 A1 | 11/2000 |
| JP | 48-101462 | 12/1973 |
| JP | 51-48505 | 12/1976 |

(Continued)

OTHER PUBLICATIONS

English translation of JP 2003-113259A.*

(Continued)

*Primary Examiner* — Alicia Toscano
(74) *Attorney, Agent, or Firm* — Oblon, Spivak, McClelland, Maier & Neustadt, L.L.P.

(57) ABSTRACT

A method for producing a polyester resin composition C), which comprises melt-kneading a polyester resin (A) which satisfies the following formulae (1), (2) and (3) and a polyester resin (B) which satisfies the following formula (4):

$$P1 \geq 10 \quad (1)$$

$$0.1 \leq Ge1 \leq 1.5 \quad (2)$$

$$0.001 \leq Ge1/P1 \leq 0.15 \quad (3)$$

$$0 \leq P2/Ti1 \leq 80 \quad (4)$$

provided that in the formulae (1), (2) and (3), P1 is the content (mol) of phosphorus atoms and Ge1 is the content (mol) of germanium atoms, per ton of the polyester resin (A), and in the formula (4), P2 is the content (mol) of phosphorus atoms and Ti1 is the content (mol) of titanium atoms, per ton of the polyester resin (B). A polyester resin composition (C) obtained by the method, and a molded product such as a film made from such a composition are also provided.

16 Claims, 1 Drawing Sheet

FOREIGN PATENT DOCUMENTS

| | | | |
|---|---|---|---|
| JP | 3-47830 | | 2/1991 |
| JP | 6-170911 | | 6/1994 |
| JP | 8-283393 | | 10/1996 |
| JP | 10-251393 | | 9/1998 |
| JP | 10-316765 | | 12/1998 |
| JP | 2000-309649 | | 11/2000 |
| JP | 2000-351840 | | 12/2000 |
| JP | 2002-173541 | | 6/2002 |
| JP | 2002-332336 | | 11/2002 |
| JP | 2003-96280 | | 4/2003 |
| JP | 2003 113259 | | 4/2003 |
| JP | 2003-113259 | * | 4/2003 |
| JP | 2003113259 A | * | 4/2003 |
| JP | 2003 313318 | | 11/2003 |
| JP | 2004-197075 | | 7/2004 |
| JP | 2004-339423 | | 12/2004 |
| JP | 2004339423 A | * | 12/2004 |
| JP | 2005-206747 | | 8/2005 |
| JP | 2005-213291 | | 11/2005 |

OTHER PUBLICATIONS

"Database WPI Week 200503", Derwent Publications LTD., London, GB; AN 2005-023326, XP002455176, & JP 2004-339423 A, Dec. 2, 2004 pp. 1-3.

"Database WPI Week 200455", Derwent Publications LTD., London, GB; AN 2004-564386, XP002455177 & JP 2004 204396 A, Jul. 22, 2004pp. 1-3.

Office Action issued Mar. 8, 2011 in Indian Application No. 1293/KOLNP/2007.

Japanese Office Action issued Sep. 27, 2011, in Patent Application No. 2005-357164 (with English-language translation).

Japanese Office Action issued Dec. 13, 2011, in Japanese Patent Application No. 2005-357164 (w/English translation).

* cited by examiner

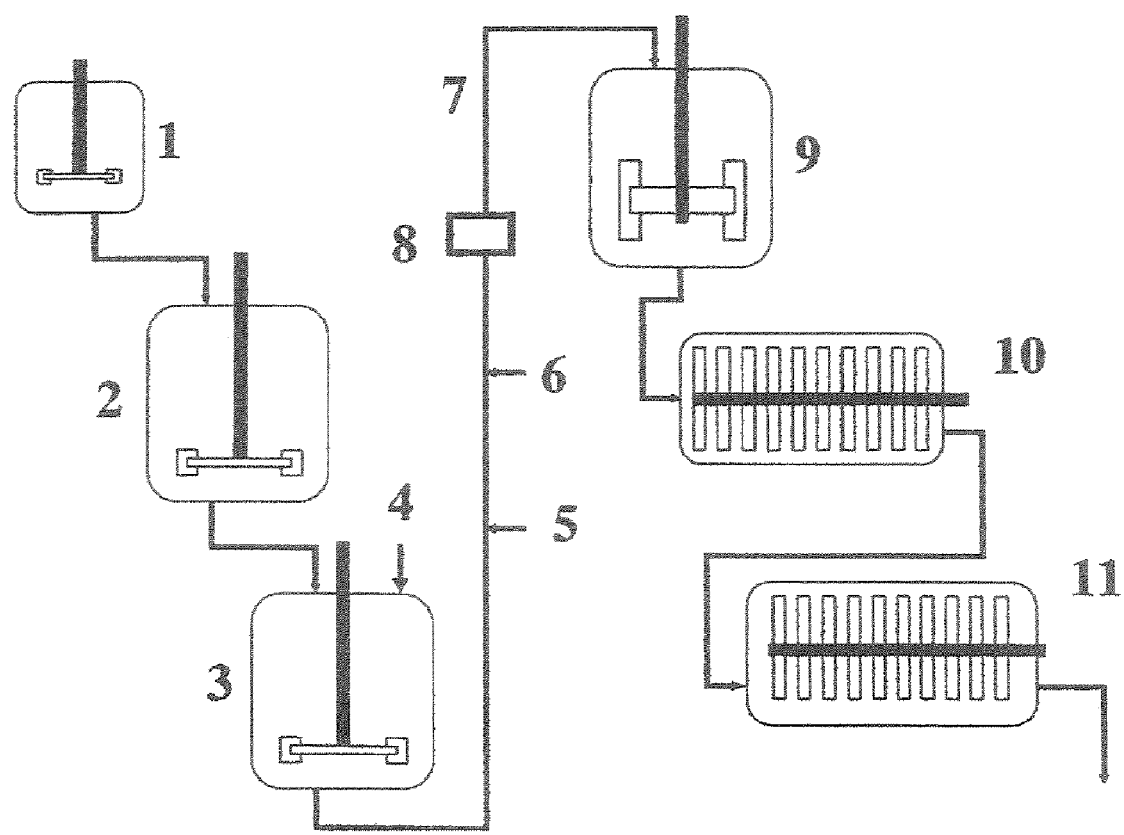

POLYESTER RESIN COMPOSITION, PROCESS FOR PRODUCING THE SAME AND MOLDING THEREOF

TECHNICAL FIELD

The present invention relates to a polyester resin composition, a method for its production and a molded product made thereof. More particularly, it relates to a polyester resin composition whereby formation of a cyclic trimer as a byproduct during melt molding is little and soiling or the like of the mold during the molding is little, a method for its production and a molded product thereof.

BACKGROUND ART

Heretofore, a polyester resin such as polyethylene terephthalate has been used for various applications, e.g. for films, sheets or bottles, since it is excellent in various physical properties such as mechanical strength, transparency, electrical characteristics and thermal properties. Especially, its application to containers for beverage products such as carbonated beverages, fruit juice beverages or various other beverages has been expanding.

Such a polyester resin is produced by using a terephthalic acid component and an ethylene glycol component as the main components, and subjecting these components to an esterification reaction or an ester exchange reaction, followed by melt polycondensation and, if necessary, solid phase polycondensation. At that time, an antimony compound is widely used as a polycondensation catalyst.

However, the antimony compound is likely to precipitate as metallic antimony in the polyester resin and may become foreign matters when the resin is formed into films, etc. Further, when it is used as a container for a beverage, the antimony remaining in the resin is feared to elute into the beverage. Accordingly, it is desired not to use such an antimony compound at all during the production and use another metal compound as the catalyst, or to use it in a very small amount if used.

As the polycondensation catalyst, a germanium compound can be used instead of the antimony compound. However, the germanium compound is expensive since its production amount is small, and it is disadvantageous from the viewpoint of costs to use it for the production of a polyester. Various proposals have been made with respect to a method for using an inexpensive and safe titanium compound as a substitute. A titanium compound as a polycondensation catalyst has high activities as compared with an antimony compound or a germanium compound, and the amount to be used may be small, and it is inexpensive as compared with the germanium compound. Thus, the titanium compound is a catalyst highly worth consideration of its industrial application.

On the other hand, the polyester resin is formed into various molded products such as films sheets or bottles by melt molding. However, during such melt molding a cyclic trimer contained in the resin or a by-product such as a cyclic trimer formed during the melt molding, has been problematic in that, for example, it causes soiling of the casting roll or the like during film forming.

As a method for reducing such a cyclic trimer, etc. during melt molding, a method has been proposed to preliminarily reduce a cyclic trimer, etc. by solid phase polycondensation (Patent Documents 1 and 2). However such a method has been inadequate, since it can not suppress a byproduct such as a cyclic trimer formed during the melt molding.

As a method for suppressing a byproduct such as a cyclic trimer to be formed during the melt molding a method has been proposed wherein after solid phase polycondensation the polycondensation catalyst in the resin is deactivated by hot water treatment (Patent Document 3). However, the effects vary depending upon the type of the polycondensation catalyst, and as a result of the study by the present inventors, it has been found that some effects are observed when a germanium compound is used as the polycondensation catalyst, but no substantial effects are observed when an antimony compound or a titanium compound is used as the polycondensation catalyst.

Further, a method is also proposed wherein to a polyester resin, a different polyester resin containing a phosphorus compound is incorporated to deactivate the polycondensation catalyst (Patent Documents 4 and 5). However, such a method is merely to disclose incorporation of a phosphorus compound, or even if a polyester resin containing a phosphorus compound is disclosed, in order to incorporate the phosphorus compound, the phosphorus compound is blended by an extruder, and by such a method, it has been difficult to produce a polyester resin containing a phosphorus compound. Further, in the examples only cases wherein an antimony compound was used as the polycondensation catalyst, are disclosed and the effects were inadequate and there was a problem such that foreign matters would be formed by precipitation of antimony.

Further, a method of incorporating a polyester resin containing a phosphorus compound to improve the thermal stability of the resulting polyester resin composition, is also disclosed (Patent Document 6). However, such a method is directed only to improvement of the thermal stability of the polyester resin obtained by melt polymerization, and no mention is made with respect to the effects for suppressing formation of an oligomer as a byproduct.

Further, a method of incorporating a polyester resin containing at least 250 ppm, as phosphorus atoms, of a phosphorus compound to control the amount of an oligomer to be formed in the resulting polyester resin composition, is disclosed (Patent Document 7). However, in such a method, an antimony compound in an amount of at least 150 ppm is used as a polymerization catalyst for the polyester resin containing at least 250 ppm, as phosphorus atoms, of a phosphorus compound, and by such a method, it is impossible to prevent a trouble by foreign matters derived from the antimony compound.

Still further, a method has been proposed wherein a polyester resin copolymerized with a phosphorus compound, is employed to deactivate a polycondensation catalyst in a polyester resin formed by using a titanium compound or an aluminum compound as the polycondensation catalyst and simultaneously to suppress the amount of a byproduct cyclic ester oligomer formed during the molding (Patent Documents 8 and 9). However, in this method, no mention is made with respect to a polyester resin having a volume resistivity suitable for film forming, and the method was still inadequate for film forming.

Patent Document 1 JP-A-48-101462
Patent Document 2 JP-A-51-48505
Patent Document 3: JP-A-3-47830
Patent Document 4: JP-A-10-316765
Patent Document 5: J-A-10-251393
Patent Document 6: JP-A-6-170911
Patent Document 7: JP-A-2004-339423
Patent Document 8: JP-A-2005-206747
Patent Document 9: JP-A-2005-213291

DISCLOSURE OF THE INVENTION

Object to be Accomplished by the Invention

The present invention has been made to solve the above problems, and it is an object of the present invention to provide a polyester resin composition whereby a byproduct such as a cyclic trimer to be formed during the melt molding is suppressed, and soiling etc. during the molding is little, and a method for its production.

Means to Accomplish the Object

To accomplish the above object, the present inventors have conducted various studies on the types and deactivation behaviors of catalysts and as a result have found that especially when melt molding is carried out by blending a polyester resin obtained by using a germanium compound as a polycondensation catalyst containing phosphorus atoms with a polyester resin obtained by using a titanium compound as a polycondensation catalyst, it is possible to reduce a cyclic trimer to be formed as a byproduct by blending it so that the ratio of phosphorus atoms to titanium atoms will be in a specific range, and the present invention has been accomplished.

Namely, the present invention provides a method for producing a polyester resin composition (C), which comprises melt-kneading a polyester resin (A) containing phosphorus atoms and germanium atoms to satisfy the following formulae (1), (2) and (3), and a polyester resin (B) containing titanium atoms to satisfy the following formula (4).

$$P1 \geq 10 \quad (1)$$

$$0.1 \leq Ge1 \leq 1.5 \quad (2)$$

$$0.001 \leq Ge1/P1 \leq 0.15 \quad (3)$$

$$0 \leq P2/Ti1 \leq 80 \quad (4)$$

provided that in the formulae (1), (2) and (3), P1 is the content (mol) of phosphorus atoms and Ge1 is the content (mol) of germanium atoms per ton of the polyester resin (A), and in the formula (4), P2 is the content (mol) of phosphorus atoms and Ti1 is the content (mol) of titanium atoms, per ton of the polyester resin (B).

Further, the present invention provides a polyester resin composition (C) obtained by melt-kneading a polyester resin (A) containing phosphorus atoms and germanium atoms and a polyester resin (B) containing titanium atoms, which polyester resin compositions (C) satisfies the following formula (6) and the following condition (a):

$$(P3/Ti2) \geq 5 \quad (6)$$

provided that P3 is the content (mol) of phosphorus atoms and Ti2 is the content (mol) of titanium atoms, per ton of the composition (C), (a) $Y \leq 8000$ and $Y-X \leq 2500$, where when the polyester resin (A) and the polyester resin (B) are melt-kneaded at 285° C. for 20 minutes in a nitrogen atmosphere X is the content (g) of a cyclic trimer per ton of the polyester resin composition before the melt kneading and Y is the content (g) of a cyclic trimer per ton of the composition (C) after the melt kneading; and a film, sheet or bottle made of such a polyester resin composition (C).

EFFECTS OF THE INVENTION

By the present invention, it is possible to obtain a polyester resin composition whereby formation of a byproduct such as a cyclic trimer during the melt molding can be suppressed, soiling or the like during the molding is little, and it is possible to obtain a molded product such as a film, sheet or bottle having good quality, which is substantially free from precipitation of an antimony compound and which contains little foreign matters.

BRIEF DESCRIPTION OF THE DRAWINGS

FIGURE is a schematic view illustrating an apparatus for producing a polyester resin used in Production Example B-2.

MEANING OF SYMBOLS

1: slurry preparation tank,
2,3: Esterification reaction tanks
4: Ethylene glycol supply pipe
5: Magnesium compound supply pipe
6: Titanium compound supply pipe
7: Reactants transport pipe
8: Filter
9, 10, 11: Polycondensation reaction tanks

BEST MODE FOR CARRYING OUT THE INVENTION

Now, the present invention will be described in detail. However, it should be understood that the following detailed description is concerned with a typical example of an embodiment of the present invention, and the present invention is by no means thereby restricted.

The polyester resin composition (C) obtainable by the method of the present invention is one obtainable by melt-kneading a polyester resin (A) containing phosphorus atoms and germanium atoms in a specific ratio and a polyester resin (B) containing phosphorus atoms and titanium atoms in a specific ratio.

<Raw Materials for Polyester Resins (A) and (B)>

The polyester resin (A) and the polyester resin (B) which may be suitably used in the method of the present invention are ones produced by subjecting a dicarboxylic acid component containing terephthalic acid and its ester-forming derivative as the main components and a diol component containing ethylene glycol as the main component to an esterification reaction or an ester exchange reaction, followed by melt polycondensation and, if necessary, solid phase polycondensation, by means of a polycondensation catalyst. They are preferably polycondensates produced from a dicarboxylic acid component wherein a terephthalic acid component occupies at least 80 mol %, more preferably at least 90 mol %, particularly preferably at least 95 mol % of the total dicarboxylic acid component, and a diol component wherein ethylene glycol occupies preferably at least 80 mol %, more preferably at least 90 mol %, particularly preferably at least 95 mol %, of the total diol component. Further, diethylene glycol formed as a byproduct in the reaction system may further be copolymerized.

In the polyester resins (A) and (B) to be used in the method of the present invention, the dicarboxylic acid component or its ester-forming derivative, other than the terephthalic acid component, may, for example, be an aromatic dicarboxylic acid or its $C_{1-4}$ alkyl ester or halide, such as phthalic acid, isophthalic acid, dibromoisophthalic acid, sodium sulfoisophthalic acid, phenylene dioxydicarboxylic acid, 4,4'-diphenyldicarboxylic acid, 4,4'-diphenylether dicarboxylic acid, 4,4'-diphenylketone dicarboxylic acid, 4,4'-diphenoxyethane dicarboxylic acid, 4,4'-diphenylsulfone dicarboxylic acid, 2,6-naphthalene dicarboxylic acid, terephthalic acid dimethyl ester or 2,6-naphthalene dicarboxylic acid dimethyl ester.

Further, the dicarboxylic acid component other than the above aromatic dicarboxylic acid or its ester-forming derivative, may, for example, be an alicyclic dicarboxylic acid such as hexahydroterephthalic acid or hexahydroisophthalic acid, or an aliphatic dicarboxylic acid such as succinic acid, glutaric acid, adipic acid, pimelic acid, suberic acid, azelaic acid, sebacic acid, undecadicarboxylic acid or dodecadicarboxylic acid, or a $C_{1-4}$ alkyl ester or halide of such an alicyclic dicarboxylic acid or aliphatic dicarboxylic acid.

Further, the diol component other than ethylene glycol may, for example, be an aliphatic diol such as diethylene glycol, trimethylene glycol, tetramethylene glycol, pentamethylene glycol, hexamethylene glycol, octamethylene glycol, decamethylene glycol, neopentyl glycol, 2-ethyl-2-butyl-1,3-propanediol, diethylene glycol, polyethylene glycol, polytetramethylene ether glycol; an alicyclic diol such as 1,2-cyclohexanediol, 1,4-cyclohexanediol, 1,1-cyclohexanedimethylol, 1,4-cyclohexanedimethylol or 2,5-norbornanedimethylol; an aromatic diol such as xylylene glycol, 4,4'-dihydroxybiphenyl, 2,2-bis(4'-hydroxyphenyl)propane, 2,2-bis(4-β-hydroxyethoxyphenyl)propane, bis(4-hydroxyphenyl)sulfone or bis(4-β-hydroxyethoxyphenyl)sulfonic acid; or an ethylene oxide adduct or propylene oxide adduct of 2,2-bis(4'-hydroxyphenyl)propane.

Further, one or more of hydroxycarboxylic acids or alkoxycarboxylic acids such as glycolic acid p-hydroxybenzoic acid and p-β-hydroxyethoxybenzoic acid, monofunctional components such as stearyl alcohol, benzyl alcohol, stearic acid, benzoic acid, t-butyl benzoate and benzoylbenzoic acid, and tri-functional or higher multifunctional components such as tricarbaryl acid, trimellitic acid, trimesic acid, pyromellitic acid, gallic acid, trimethylolethane, trimethylolpropane, glycerol and pentaerythritol, may be employed as copolymerizable components.

<Polyester Resin (A)>

The polyester resin (A) to be used in the method of the present invention is a resin produced by using mainly a germanium compound as a polycondensation catalyst at the time of its production. Here, "mainly" means that basically only a germanium compound is used as the polycondensation catalyst. However, if necessary, a small amount of another metal compound may be used in combination as the polycondensation catalyst. For example, in a case where an antimony compound is used in combination as another metal compound, its amount is at most 1.0 mol, preferably at most 0.5 mol as antimony atoms per ton of the resin obtainable. When a germanium compound is used as the polycondensation catalyst it is possible to minimize the influence for deactivation of the polymerization catalyst by phosphorus of the phosphorus compound to be used as a stabilizer, whereby good polymerization activities can be obtained.

Specifically the germanium compound may, for example, be germanium dioxide, germanium tetraoxide, germanium hydroxide, germanium fluoride, germanium chloride, germanium bromide, germanium iodide, germanium dichlorinated oxide, germanium sulfide, germanium tetraacetate, tetraphenylgermanium, germanium oxalate, germanium tetraethoxide or germanium tetra-n-butoxide. Particularly preferred is germanium dioxide.

With respect to the content of the germanium compound in the polyester resin (A), the upper limit as germanium atoms per ton of the resin is 1.5 mol, preferably 1.2 mol, more preferably 1 mol, particularly preferably 0.7 mol. If the content exceeds the above limit, coloration is likely to result during the drying, and such will be also costly and thus undesirable. The lower limit is 0.1 mol, preferably 0.15 mol, further preferably 0.2 mol, particularly preferably 0.25 mol. If the content is lower than the lower limit, no adequate polycondensation activities may sometimes be obtainable such being undesirable.

In a case where an antimony compound is added as another metal compound to be used in combination as the polycondensation catalyst, if antimony atoms exceed 1.0 mol per ton of the resin, foreign matters attributable to the antimony metal are likely to be formed in the resin thereby obtained. Further, other metal compounds may be used in combination with the germanium compound as the polycondensation catalyst, but such use in combination is not preferred because of the influence over deactivation of the catalyst by phosphorus or because such metal compounds are likely to form foreign matters.

It is essential that the polyester resin (A) contains phosphorus atoms, and usually, such phosphorus atoms are derived from a phosphorus compound which is added as a stabilizer during the production of the resin. Specifically, the phosphorus compound to be used may, for example, be orthophosphoric acid; polyphosphoric acid; a pentavalent phosphorus compound such as trimethyl phosphate, triethyl phosphate, tri-n-butyl phosphate, trioctyl phosphate, triphenyl phosphate, tricresyl phosphate, tris(triethylene glycol) phosphate, ethyldiethyl phosphonoacetate, methyl acid phosphate, ethyl acid phosphate, isopropyl acid phosphate, butyl acid phosphate, monobutyl phosphate, dibutyl phosphate, dioctyl phosphate or triethylene glycol acid phosphate; phosphorous acid; hypophosphorous acid; or a trivalent phosphorus compound such as diethyl phosphite, trisdodecyl phosphite, trisnonyldecyl phosphite or triphenyl phosphite. Among them, a trivalent phosphorus compound usually has a higher reducing property than a pentavalent phosphorus compound, and a metal compound added as a polycondensation catalyst is likely to be reduced and precipitated to cause formation of foreign matters. Accordingly, a pentavalent phosphorus compound is preferred.

As a phosphorus compound to be used for the production of the polyester resin (A), orthophosphoric acid polyphosphoric acid, diethyl phosphite, ethyl acid phosphate or triethyl phosphate is preferred, and orthophosphoric acid, polyphosphoric acid or ethyl acid phosphate is particularly preferred.

The content of the phosphorus compound in the polyester resin (A) is at least 10 mol as phosphorus atoms per ton of resin, as represented by the following formula (1) wherein P1 is the content (mol) of phosphorus atoms, preferably at least 15 mol, further preferably at least 20 mol $$P1 \geq 10 \tag{1}$$

If the content of the phosphorus compound is less than the lower limit, there may be a case where no adequate effect for suppressing formation of a byproduct such as a cyclic trimer is obtainable unless the weight ratio of the polyester resin (A) to the polyester resin (B) (polyester resin (A)/polyester resin (B)) is made high when the polyester resin (A) and the polyester resin (B) are melt-kneaded such being undesirable. The upper limit for the content of the phosphorus compound is not particularly limited. However, the presence in a large amount may sometimes lower the polymerization rate, and the content is preferably at most 100 mol.

In the polyester resin (A), when the content (mol) of germanium atoms per ton of the resin is represented by Ge1, the lower limit of the ratio of the germanium atoms to the phosphorus atoms (Ge1/P1) in the resin (A) is 0.001, preferably 0.005, further preferably 0.008, particularly preferably 0.01.

If the ratio is less than the lower limit, the polymerizability may sometimes be inadequate. The upper limit is 0.15, preferably 0.1, more preferably 0.075, particularly preferably 0.050. If the ratio exceeds the upper limit, coloration of the polymer tends to be substantial, and consequently, the color of the obtainable polyester resin composition (C) tends to deteriorate, such being undesirable.

If the polyester resin (A) contains foreign matters derived from the polycondensation catalyst, other additives, etc., the physical properties of the polyester resin composition (C) obtainable by the present invention tend to deteriorate, and the quality of a molded product such as a film or bottle formed from such a composition (C) tends to be poor. Accordingly, it is preferred that the number of foreign matters having sizes of at least 0.1 mm contained in the polyester resin (A) is at most 1 per 50 g of the polyester resin (A), and no foreign matter having a size of at least 0.3 mm is contained. Here, the size of a foreign matter is represented by the length of the longest portion of the foreign matter.

<Catalyst, Etc. for the Production of Polyester Resin (B)>

In the production of the polyester resin (B), as a catalyst to be used for the polycondensation reaction, a known polycondensation catalyst may be employed such as a germanium compound, an antimony compound, an aluminum compound, a tin compound or a titanium compound. However, in the present invention, it is essential to employ at least a titanium compound, and it is preferred not to use or to use in an amount as small as possible a catalyst which can be a cause for foreign matters, such as an antimony compound. The titanium compound may be suitably selected for use among conventional titanium compounds, and an oxide, a hydroxide, an alkoxide, an acetate, a carbonate, an oxalate or a halide of titanium may, for example, be mentioned.

Specifically, the titanium compound may, for example, be a titanium alkoxide such as tetra-n-propyl titanate, tetra-i-propyl titanate, tetra-n-butyl titanate tetramer, tetra-t-butyl titanate, tetracyclohexyl titanate, tetraphenyl titanate or tetrabenzyl titanate, a titanium oxide obtainable by hydrolysis of a titanium alkoxide, a titanium/silicon or zirconium composite oxide obtainable by hydrolysis of a mixture of a titanium alkoxide with a silicon alkoxide or a zirconium alkoxide, titanium acetate, titanium oxalate, titanium potassium oxalate, titanium sodium oxalate, potassium titanate, sodium titanate, a titanic acid/aluminum hydroxide mixture, titanium chloride, a titanium chloride/aluminum chloride mixture, titanium bromide, titanium fluoride, potassium hexafluorotitanate, cobalt hexafluorotitanate, manganese hexafluorotitanate, ammonium hexafluorotitanate or titanium acetyl acetonate. Among them, a titanium alkoxide such as tetra-n-propyl titanate, tetra-i-propyl titanate or tetra-n-butyl titanate, titanium oxalate or titanium potassium oxalate is preferred, and tetra-n-butyl titanate is particularly preferred.

With respect to the content of titanium atoms in the polyester resin (B), the lower limit is preferably 0.002 mol, more preferably 0.02 mol, further preferably 0.04 mol, per ton of the polyester resin (B). If the amount is less than the lower limit, the activities as the catalyst tend to be inadequate. The upper limit is preferably 1 mol, more preferably 0.5 mol, further preferably 0.3 mol. If the content is larger than the upper limit, yellowing of the polyester resin (B) tends to be strong, and consequently, yellowing tends to be strong with the polyester resin composition (C) after the melt-kneading.

Further, the polyester resin (B) preferably contains phosphorus atoms, and such phosphorus atoms are usually derived from a phosphorus compound which is added as a stabilizer at the time of the production of the resin (B). The phosphorus compound to be used may be a compound similar to one which is used for the production of the above polyester resin (A). Namely, the phosphorus compound to be used for the production of the polyester resin (B) is preferably a pentavalent phosphorus compound, more preferably orthophosphoric acid, trimethyl phosphate or ethyl acid phosphate, particularly preferably ethyl acid phosphate.

By the use of such a phosphorus compound, it is possible to suppress formation of foreign matters made of a metal compound and a phosphorus compound added at the time of the polycondensation.

With respect to the content of phosphorus atoms in the polyester resin (B), the ratio to titanium atoms is required to satisfy the following formula (4) wherein P2 represents the content of phosphorus atoms, and Ti1 represents the content of titanium atoms, per ton of the resin:

$$0 \leq P2/Ti1 \leq 80 \tag{4}$$

The ratio of phosphorus atoms to titanium atoms (P2/Ti1) is preferably from 0.1 to 40, more preferably from 0.2 to 20, further preferably from 1 to 10.

The content of phosphorus atoms is usually at most 4 mol, preferably at most 2 mol, more preferably at most 1 mol and usually at least 0 mol, preferably at least 0.03 mol, further preferably at least 0.1 mol, particularly preferably at least 0.15 mol, per ton of the resin. If the content of the phosphorus atoms is too small i.e. less than 0.03 mol, the effects as the stabilizer during the production tend to be inadequate, and if it exceeds 4 mol, the polycondensation reaction rate tends to be low, such being undesirable.

Further, in the polyester resin (B) of the present invention, the content of the cyclic trimer is preferably at most 8,000 g, more preferably at most 5000 g, further preferably at most 3,000 g, per ton of the resin. If the content of the cyclic trimer exceeds 8,000 g, for example, soiling of the casting roll is likely to take place when a polyester resin composition (C) of the present invention obtainable by using the polyester resin (B) thereby obtained, is formed into a film.

<Other Catalysts, Etc. for the Production of Polyester Resins (A) and (B)>

Further, the polyester resin (A) and the polyester resin (B) to be used for the method of the present invention may further contain at least one type of metal atoms selected from the group consisting of metal elements in Group 1A of the Periodic Table, metal atoms in Group 2A of the Periodic Table, manganese, iron and cobalt, derived from metal compounds other than the above-mentioned polycondensation catalysts, which may be used as a co-catalyst, an esterification catalyst, etc. Such compounds may, for example, be oxides, hydroxides alkoxides, acetates, carbonates, oxalates and halides, of lithium, sodium, potassium, magnesium, calcium, manganese, iron and cobalt. Specifically, lithium acetate, sodium acetate, potassium acetate, magnesium oxide, magnesium hydroxide, magnesium alkoxide, magnesium acetate, magnesium carbonate, calcium oxide, calcium hydroxide, calcium acetate, calcium carbonate, manganese oxide, manganese hydroxide, manganese acetate, ferric acetate cobalt formate, cobalt acetate, cobalt oxalate, cobalt carbonate, cobalt bromide and cobalt acetyl acetonate may, for example, be mentioned. Among them a magnesium compound is preferred, and particularly preferred is magnesium acetate or its hydrate.

In the polyester resin (B), a bivalent metal compound is preferably added to have its volume resistivity suppressed to be low. Such a bivalent metal compound may be suitably selected for use among the above-mentioned bivalent metal compounds, so that the desired volume resistivity can be obtained.

Such a metal compound may be added at an optional time from the initiation of the esterification reaction or the ester exchange reaction to the completion of the polycondensation reaction. However, it is preferably added during a period from the initiation of the esterification reaction or the ester exchange reaction to the initiation of the polycondensation reaction. Particularly in the case of the esterification reaction, it is preferred to add it during a period of from completion of the esterification reaction to the initiation of the polycondensation reaction. As preferred metal compounds, a calcium compound and a magnesium compound may be mentioned. Among them, calcium acetate and magnesium acetate are preferred, and magnesium acetate is particularly preferred.

The volume resistivity of the resin (B) is preferably at most $50 \times 10^7$ Ω·cm, more preferably at most $20 \times 10^7$ Ω·cm. Here, the volume resistivity is a value calculated by the measuring method which will be described hereinafter.

If the volume resistivity is higher than the above value, the contact between the sheet extruded from the die and the cooling drum during the film formation by using the resulting polyester resin composition (C), tends to be poor, and as a result, cooling tends to be inadequate whereby it tends to be difficult to increase the film forming rate.

<Polyester Resin Composition (C)>

The polyester resin composition (C) of the present invention is a polyester resin composition (C) obtained by melt-kneading the polyester resin (A) containing phosphorus atoms and germanium atoms and the polyester resin (B) containing titanium atoms, and the composition (C) is a composition which satisfies the following formula (6) and at the same time satisfies the following condition (a):

$$(P3/Ti2) \geq 5 \qquad (6)$$

provided that P3 is the content (mol) of phosphorus atoms and Ti2 is the content (mol) of titanium atoms, per ton of the composition (C), (a) $Y \leq 8000$ and $Y-X \leq 2500$, where when the polyester resin (A) and the polyester resin (B) are melt-kneaded at 285° C. for 20 minutes in a nitrogen atmosphere, X is the content (g) of a cyclic trimer per ton of the polyester resin composition before the melt kneading, and Y is the content (g) of a cyclic trimer per ton of the composition (C) after the melt kneading.

In the polyester resin composition (C), the ratio (P3/Ti2) of the content (mol) of phosphorus atoms to the content (mol) of titanium atoms, per ton of the composition, represented by the above formula (6) is required to be at least 5, but is preferably at least 10, more preferably at least 20. If the ratio is less than 5, the amount of a cyclic trimer or the like to be formed as a byproduct when the composition is melted for molding, tends to be large, or the color of the polyester resin composition (C) is likely to deteriorate, such being undesirable. Further, such a molar ratio is preferably at most 1,000, more preferably at most 500, further preferably at most 200. If it exceeds 1,000, the polycondensation rate tends to be slow during the production of the raw material resin for the polyester resin composition (C), such being undesirable.

Further, the polyester resin composition (C) of the present invention is required to satisfy the above condition (a). Namely, $Y \leq 8000$ and $Y-X \leq 2500$, where when the polyester resin (A) and the polyester resin (B) are melt-kneaded at 285° C. for 20 minutes in a nitrogen atmosphere, X is the content (g) of a cyclic trimer per ton of the polyester resin composition before the melt kneading, and Y is the content (g) of a cyclic trimer per ton of the composition (C) after the melt kneading. The upper limit for Y is 8,000, but preferably 6,000, further preferably 4,000. If Y exceeds 8,000, a foreign matter tends to be easily formed during the molding, such being undesirable.

Further the upper limit for Y−X is 2500, but preferably 2,000, particularly preferably 1,000. If Y−X exceeds 2,500, formation of an oligomer such as a cyclic trimer during the molding at a high temperature tends to be substantial, whereby a foreign matter is likely to be formed, such being undesirable.

Further at the time of obtaining the polyester resin composition (C) of the present invention the weight ratio of the polyester resin (A) to the polyester resin (B) (polyester resin (A)/polyester resin (B)) is preferably at most 0.50 more preferably at most 0.25, further preferably at most 0.1. If this weight ratio is higher than 0.5, the amount of the polyester resin (A) in the composition (C) tends to be large, and accordingly, the amount of the metal compound to be used as a polycondensation catalyst, such as a germanium compound, tends to be large and costly, or when an antimony compound is used, its content will be large, and consequently, foreign matters from such a composition tend to be substantial in the molded product.

Further, the lower limit of such a weight ratio is more than 0, but is preferably at least 0.01, more preferably at least 0.02. If the lower limit is 0, i.e. if no polyester resin (A) is used, no effects for suppressing a byproduct such as a cyclic trimer to be formed, will be obtained, such being undesirable.

In the polyester resin composition (C) of the present invention, in addition to the above polyester resin (A) and the polyester resin (B), another resin (third component) may also be used, as the case requires. However, the weight ratio of the total amount of the polyester resins (A) and (B) to the polyester resin composition (C) [((A)+(B))/(C)] is preferably at least 0.9, more preferably at least 0.95, particularly preferably at least 0.99. If the weight ratio is less than 0.9, the effect for suppressing a byproduct such as a cyclic trimer to be formed tends to be inadequate by an influence of the third component other than the polyester resins (A) and (B), such being undesirable.

<Production of Polyester Resins (A) and (B)>

For the production of the polyester resins (A) and (B) to be used in the method of the present invention, a common method for producing polyester resins may basically be used except that they are respectively adjusted to contain the prescribed amounts of phosphorus atoms and germanium atoms (resin (A)) and the prescribed amount of the titanium atoms (resin (B)). Namely the above-mentioned dicarboxylic acid component containing terephthalic acid or its ester-forming derivative as the main component and the diol component containing ethylene glycol as the main component, are subjected to an esterification reaction in an esterification reactor usually at a temperature of from 240 to 280° C. usually under a pressure at a level of a relative pressure of from 0 to $4 \times 10^5$ Pa to the atmospheric pressure, with stirring for from about 1 to 10 hours, or to an ester exchange reaction in the presence of an ester exchange catalyst, and then, the obtained polyester low molecular weight product as the esterification reaction product or the ester exchange reaction product, is transferred to a polycondensation tank and subjected to melt polycondensation in the presence of a polycondensation catalyst and a phosphorus compound usually at a temperature of from 250 to 290° C. under normal pressure and then gradually reduced pressure and finally under a reduced pressure of from 1,333 to 13.3 Pa as the absolute pressure, with stirring for from 1 to 20 hours. This method may be of a continuous type or a batch type.

Further, at that time, preparation of the starting material slurry comprising the dicarboxylic acid component containing terephthalic acid or its ester forming derivative as the main components and the diol component containing ethylene glycol as the main component, is preferably carried out so that the molar ratio of the total diol component to the total dicarboxylic acid component is within a arrange of from 1.0 to 2.5. Further, the esterification ratio of the polyester raw material product as the esterification reaction product or the ester exchange reaction product (the proportion of the one reacted with the diol component and esterified among the total carboxyl groups of the raw material dicarboxylic acid component) is preferably at least 95%.

The addition of the polycondensation catalyst, the phosphorus compound and the optional compound of at least one metal selected from the group consisting of metal elements in Group 1A of the Periodic Table, elements in Group 2A of the Periodic Table, manganese, iron and cobalt, at the time of the polycondensation, may be made at an optional stage in the process for preparing a slurry of terephthalic acid and ethylene glycol as the raw material, and other dicarboxylic acid component employed as the case requires or in the process for the esterification reaction or ester exchange reaction, or at an initial stage of the melt polycondensation step.

Further, within a range not to impair the effect of the present invention, various additives such as other known esterification catalyst, ester exchange catalyst, polycondensation catalyst, nucleating agent, inorganic filler, lubricant, inorganic filler, lubricant, slipping agent, anti-blocking agent, stabilizer, antistatic agent, anti-fogging agent and pigment, may be used in necessary amounts.

The resin obtained by the above melt polycondensation is usually withdrawn in the form of a strand from the discharge outlet provided at the bottom of the polycondensation tank and cut by a cutter under cooling with water or after cooling with water into particulates such as pellets or chips. Further, as the case requires, the particulates after such melt polycondensation are usually heated at a temperature of from 60 to 180° C. in an inert gas atmosphere such as nitrogen, carbon dioxide or argon or in a steam atmosphere, or in a steam-containing inert gas atmosphere to have the surface of the resin particulates crystallized and then subjected to heat treatment usually at a temperature of from immediately below the adhesive temperature of the resin to lower by 80° C. than the adhesive temperature usually for a period of at most 50 hours in an inert gas atmosphere and/or under a reduced pressure of from about 1,333 to 13.3 Pa as the absolute pressure, while the particulates are permitted to flow to avoid fusion to one another, for solid phase polycondensation. By this solid phase polycondensation, the particulates can further be highly polymerized, and at the same time, it is possible to reduce the content of a cyclic trimer as the reaction byproduct, or the content of acetaldehyde.

<Production of Polyester Resin Composition (C)>

The polyester resin composition (C) of the present invention can be prepared by melt-kneading the above-described polyester resins (A) and (B) in the above-mentioned suitable weight ratio. Usually, it is obtained by kneading and extruding by an extruder a resin blend having the polyester resins (A) and (B) uniformly mixed, followed by pelletizing. Otherwise, the above-mentioned pelletized polyester resins (A) and (B) are introduced into a raw material hopper of e.g. an extruder for forming a film or an injection molding machine for molding bottles, whereby the composition (C) is obtainable in the melting zone of the cylinder of the extruder or the injection molding machine, and it is thereby possible to suppress formation of a cyclic trimer as a byproduct during the melting.

The polyester resin composition (C) of the present invention can be used suitably as a raw material for various fabrication employing a common method such as melt extrusion or injection molding, i.e. as a raw material for films bottles or sheets. For films or sheets, the melting time in the extrusion process is long as compared with for bottles, whereby the effects for suppressing formation of a cyclic trimer as a byproduct can suitably be obtained, such being particularly preferred. Further, for films or sheets, it is necessary to lower the volume resistivity in order to improve the productivity during the fabrication. For this purpose, it is preferred to employ one having a low volume resistivity as the polyester resin (B). Further, in general, the larger the content of phosphorus atoms in the polyester resin, the higher the volume resistivity. However, with the films or sheets made of the polyester is resin composition (C) produced by the method of the present invention, the volume resistivity is lower than the volume resistivity normally expected from the content of phosphorus atoms in the composition, and the productivity is good.

The volume resistivity of the polyester resin composition (C) obtained by the method of the present invention is preferably at most $60 \times 10^7$ Ω·cm, more preferably at most $30 \times 10^7$ Ω·cm. If the volume resistivity is higher than this, the contact between the cooling drum and the sheet extruded from the die at the time of the film forming tends to be poor as mentioned above, and consequently, cooling tends to be inadequate and it will be difficult to increase the film forming speed.

It is preferred that a film formed from the polyester resin composition (C) obtained by the method of the present invention, has protrusions having heights of at least 0.27 μm at a rate of at most 100 protrusions/10 cm$^2$ and protrusions having heights of at least 0.54 μm at a rate of at most 30 protrusions/10 cm$^2$, on the film surface. The measurement of protrusions on the film surface is in accordance with the after-mentioned measuring method.

EXAMPLES

Now, the present invention will be described in detail with reference to Preparation Examples and Working Examples. However, it should be understood that the present invention is by no means restricted to such specific Examples.

Further, in the present invention various measuring methods are as follows.

1. Content of Metal Atoms 2.5 g of a polyester resin sample was ashed and completely decomposed by a usual method in the presence of sulfuric acid and then adjusted to 50 ml with distilled water, followed by quantitative analysis by plasma emission spectrometry 2. Intrinsic Viscosity 0.50 g of a freeze-pulverized polyester resin sample was dissolved in a solvent mixture of phenol/tetrachloroethane (weight ratio 1/1) at a concentration (a) of 1.0 g/dl at 110° C. for 30 minutes, and then, the relative viscosity ($\eta$rel) to the stock solution was measured at 30° C. by means of an Ubbelohde capillary viscometer. A ratio ($\eta$sp/a) of the specific viscosity ($\eta$sp) obtained from this relative viscosity ($\eta$rel)−1 to the concentration (a) is obtained and with respect to cases where the concentration (a) was changed to 0.5 g/dl, 0.2 g/dl and 0.1 g/dl, the respective ratios ($\eta$sp/a) were obtained in the same manner, whereupon from these values a ratio ($\eta$sp/a) when the concentration (a) being 0 was extrapolated was obtained as the intrinsic viscosity [$\eta$] (dl/g).

3 Content of Cyclic Trimer 4 mg of a polyester resin sample was dissolved in 3 ml of a solvent mixture of chloroform/hexafluoroisopropanol (volume ratio:2/1 and further diluted by an addition of 40 ml of chloroform. With respect to the obtained solution, quantitative analysis was carried out by means of GPC ("HLC-8120GPC", manufactured by TOSOH CORPORATION.

4. Color

A polyester resin sample was filled fully in a cylindrical powder calorimetric cell having an inner diameter of 36 mm and a depth of 15 mm, and by means of a calorimetric color difference meter ("ZE-2000", manufactured by Nippon Denshoku Industries Co., Ltd.), color coordinate b of the Hunter's color difference formula in the Lab calorimetric system disclosed in Japanese Industrial Standards, 1970 Edition (JIS Z8730 Reference 1), was obtained as a simple average value of four portions measured by rotating the cell 90° at a time by a reflection method 5. Volume Resistivity 15 g of a polyester resin sample was put into a branched test tube having an inner diameter of 20 mm and a length of 180 mm, and after replacing the interior of the test tube sufficiently with nitrogen, the test tube was immersed in an oil bath of 250° C. The interior of the test tube was evacuated to at most 1 Torr by a vacuum pump and vacuum dried for 20 minutes. Then, the oil bath temperature was raised to 285° C. to have the polyester resin sample melted. Then, nitrogen pressurization and depressurization were repeated to remove the included air bubbles. In this melt, two stainless steel electrode sheets having an area of 1 $cm^2$ were inserted in parallel with a distance of 5 mm (the rear sides not facing to each other are covered with an insulator), and after the temperature was stabilized, a DC voltage of 100 V was applied by a resistance meter ("MODEL HP4339B" manufactured by Hewlett-Packard), and the resistance at that time was calculated and taken as the volume resistivity ($\Omega \cdot cm$).

6. Measurement of the Number of Foreign Matters of at Least 0.1 Mm in Polyester Resin (A)

50 g of a polyester resin sample was put into a mesh basket having apertures not to let the sample pass therethrough, and pure water was poured on the sample to thoroughly wash it. The washed sample was dried at 60° C. for 1 hour.

The sample was spread on a table provided with a backlight of a fluorescent lamp, and the sample grains were thoroughly inspected one by one by means of a magnifying glass of two magnifications. With respect to a sample containing foreign matters, the size of each foreign matter was inspected by a magnifier of 10 magnifications, manufactured by PEAK Co., and among is foreign matters contained in the sample, the numbers of foreign matters of from 0.1 to 0.2 mm, from 0.2 to 0.3 mm and more than 0.3 mm were counted and taken as the numbers of foreign matters. The size of a foreign matter was represented by the length of its longest portion. The results are shown in Table 1.

7. Evaluation of the Number of Protrusions on the Biaxially Stretched Film Surface (FE Evaluation)

10 kg of a polyester resin (C) sample was crystallized and dried at 180° C. for 2 hours in a hot air dryer to bring the moisture content to not more than 100 ppm. The dried resin sample was melt-extruded at a resin temperature of 285° C. at an extrusion rate of 8 kg/hr by a tubular film forming machine having a metal fiber sintered filter (95% screening precision-25 μm) built in a single screw extruder of 40 mm in diameter and equipped with a quadruple spiral ring die of 80 mm in diameter, and cooled by a cooling ring of 60 mm in diameter for tubular forming to obtain a tubular film having a thickness of 210 μm and a folded width of 10 cm. Then, by means of a biaxial stretching machine manufactured by T.M. Long Co.), the non-stretched film was preliminarily heated at 92° C. for 2 minutes and then simultaneously biaxially stretched 4.0 times in a longitudinal direction and 3.5 times in a transverse direction at a stretching speed of 20,000%/min and after the stretching subjected to heat setting at 92° C. for 1 minute to obtain a biaxially stretched film.

With respect to the obtained biaxially stretched film, the number of protrusions on the film surface was observed by the following method and evaluated by the following standards, and the results are shown in Table 3.

The biaxially stretched film was put on an angular metal frame made of stainless steel and subjected to aluminum vapor deposition in a vacuum vapor deposition machine. Then, on its surface, a frame of 2.0 cm×2.5 cm was marked at random, and the number of coarse protrusions within the area was observed by a two-beam interferencemicroscope using, as a light source, white light of a halogen lamp filtered through a G filter. A coarse protrusion is observed as interference fringe contour lines, and as the height of the protrusion increases, the number of such contour lines increases. In the present invention, the number of protrusions was counted by the following classification depending upon the number of contour lines for each of the protrusion heights of 0.27 μm and 0.54 μm and calculated per a film area of 10 $cm^2$.

(1) Number of protrusions having a height of at least 0.27 μm having at least one contour line.

(2) Number of protrusions having a height of at least 0.54 μm having at least two contour lines.

<Evaluation of Biaxially Stretched Film Surface>

○: Very good film

The number of protrusions having a height of at least 0.27 μm is at most 50 protrusions/10 $cm^2$, and the number of protrusions having a height of at least 0.54 μm is at most 10 protrusions/10 $cm^2$.

Δ: Useful film

The number of protrusions having a height of at least 0.27 μm is at most 100 protrusions/10 $cm^2$, and the number of protrusions having a height of at least 0.54 μm is at most 30 protrusions/10 $cm^2$.

×: Useless film

The number of protrusions having a height of at least 0.27 μm is more than 100 protrusions/10 $cm^2$ or the number of protrusions having a height of at least 0.54 μm is more than 30 protrusions/10 $cm^2$.

Preparation Example A-1

Preparation of Polyester Resin (A)-1

A slurry comprising 43 kg (260 mol) of terephthalic acid and 19 kg (312 mol) of ethylene glycol, was supplied over a period of 4 hours to an esterification reactor having about 50 kg of bis(hydroxyethyl) terephthalate preliminarily charged and maintained at a temperature of 250° C. under a relative pressure of $1.2 \times 10^5$ Pa, and the esterification reaction was carried out for further 1 hour after completion of the supply. 50 kg of the product of this esterification reaction was transferred to a polycondensation tank.

Then, orthophosphoric acid and germanium dioxide were added every 5 minutes in the form of an ethylene glycol solution to the above polycondensation tank having the esterification reaction product transferred. They were added so that 40 mol of phosphorus atoms and 0.5 mol of germanium atoms per ton of the obtained resin would be contained. Then, the interior of the reaction system was heated from 250° C. to 280° C. over a period of 2 hours and 30 minutes, and at the same time, the pressure was reduced from atmospheric pressure to 400 Pa (absolute pressure) in 1 hour, and while the same pressure was maintained, melt polycondensation was carried out for a time until the intrinsic viscosity of the obtained resin would be 0.64 dl/g, whereupon the resin was withdrawn in the form of a strand from the discharge outlet provided at the bottom of the polycondensation tank, cooled with water and then formed into pellets by a cutter, to obtain about 40 kg of a polyester resin (A). The physical properties of the obtained resin are shown in Table 1.

Preparation Example A-2

Preparation of Polyester Resin (A)-2

A polyester resin (A)-2 was prepared in the same manner as the polyester resin (A)-1 in the same manner as in Preparation Example A-1 except that in Preparation Example A-1, orthophosphoric acid was changed to polyphosphoric acid. The physical properties of the obtained resin are shown in Table 1.

Preparation Example A-3

Preparation of Polyester Resin (A)-3

A polyester resin (A)-3 was prepared in the same manner as the polyester resin (A)-1 in the same manner as in Preparation Example A-1 except that in Preparation Example A-1, orthophosphoric acid was changed to ethyl acid phosphate.

The physical properties of the obtained resin are shown in Table 1.

Preparation Example A-4

Preparation of Polyester Resin (A)-4

50 kg (260 mol) of dimethyl terephthalate and 32.3 kg (520 mol) of ethylene glycol were supplied to an ester exchange reactor at 150° C., and as an ester exchange catalyst, magnesium acetate tetrahydrate was added so that 4.1 mol of magnesium atoms would be contained per ton of the resin obtained as an ethylene glycol solution and then, the temperature of the reactor was raised to 225° C. over a period of 3 hours, and then maintained at that temperature for 1 hour to complete the ester exchange reaction. This ester exchange reaction product was transferred to a polycondensation tank.

Then, orthophosphoric acid and germanium dioxide were added every 5 minutes in the form of an ethylene glycol solution to the above polycondensation tank having the ester exchange reaction product transferred. They were added so that 35.5 mol of phosphorus atoms and 0.6 mol of germanium atoms would be contained per ton of the obtained resin. Then, the interior of the reaction system was heated from 225° C. to 280° C. over a period of 2 hours and 30 minutes, and at the same times the pressure was reduced from normal pressure to 400 Pa (absolute pressure) in 85 minutes, and while the same pressure was maintained, melt polycondensation was carried out for a time until the intrinsic viscosity of the obtained resin would be 0.64 dl/g, and the resin was withdrawn in the form of a strand from the discharge outlet provided at the bottom of the polycondensation tank, cooled with water and then formed into pellets by a cutter to obtain about 40 kg of a polyester resin (A)-4. The physical properties of the obtained resin are shown in Table 1.

Preparation Comparative Example 1

Preparation of Polyester Resin (A)-5

50 kg (260 mol) of dimethyl terephthalate and 32.3 kg (520 mol) of ethylene glycol were supplied to an ester exchange reactor at 150° C., and as an ester exchange catalyst, manganese acetate tetrahydrate was added so that 2.1 mol of manganese atoms would be contained per ton of the resin obtained as an ethylene glycol solution. Then, the temperature of the reactor was raised to 225° C. over a period of 3 hours. After 20 minutes from the initiation of distillation of methanol formed by the ester exchange reaction, antimony trioxide was added so that 1.6 mol of antimony atoms would be contained per ton of the resin.

The temperature was raised to 225° C. over a prescribed time, and after the temperature rise, the temperature was maintained at that level for 1 hour, and trimethyl phosphate (TMA) was added so that 13 mol of phosphorus atoms would be contained per ton of the resin, and the ester exchange reaction was substantially completed. This reaction product was transferred to a polycondensation tank, and potassium acetate was added so that 1.3 mol of potassium atoms would be contained per ton of the resin. Then, the interior of the reaction system was heated from 225° C. to 280° C. over a period of 2 hours and 30 minutes, and at the same time, the pressure was reduced from normal pressure to 400 Pa (absolute pressure) in 85 minutes, and while the same pressure was maintained, melt polycondensation was carried out for a time until the intrinsic viscosity of the obtained resin would be 0.60 dl/g, and the resin was withdrawn in the form of a strand from the discharge outlet provided at the bottom of the polycondensation tank, cooled with water formed into pellets by a cutter to obtain about 40 kg of a polyester resin (A)-5. The physical properties of the obtained resin are shown in Table 1.

Preparation Comparative Example 2

Preparation of Polyester Resin (A)-6

A polyester resin (A)-6 was prepared in the same manner as in Preparation Comparative Example 1 except that in Preparation Comparative Example 1, the amount of trimethyl phosphate added was changed to 40 mol as phosphorus atoms per ton of the resin, by carrying out the polycondensation reaction until the intrinsic viscosity became 0.60 dl/g. The physical properties of the obtained resin are shown in Table 1.

In the polyester resins (A) obtained in these Preparation Comparative Examples 1 and 2, foreign matters of at least 0.3 mm were contained, such being undesirable for the production of a film from the resin composition (C) of the present invention.

Preparation Example A-5

Preparation of Polyester Resin (A)-7

Melt polycondensation was carried out for a time until the intrinsic viscosity of the obtained resin would be 0.64 dl/g in the same manner as in the method for producing the polyester resin (A)-1 in Preparation Example A-1 except that orthophosphoric acid and germanium dioxide were added in such amounts that 12 mol of phosphorus atoms and 1.5 mol of germanium atoms would be contained per ton of the resin, and the resin was withdrawn in the form of a strand from the discharge outlet provided at the bottom of the polycondensation tank, cooled with ice and then formed into pellets by a cutter to obtain about 40 kg of a polyester resin (A). The results are shown in Table 1. The color of the polyester resin (A)-7 obtained in this Example was slightly poor.

Preparation Comparative Example 3

Preparation of Polyester Resin (A)-8

Melt polycondensation was carried out in the same manner as in the method for producing the polyester resin (A)-1 in Preparation Example A-1 except that orthophosphoric acid and germanium dioxide were added in such amounts that 40 mol of phosphorus atoms and 0.18 mol of germanium atoms would be contained per ton of the resin. In this reaction system, polymerizability was poor, and although the experiment was continued for 5 hours, the intrinsic viscosity did not reach 0.55 dl/g, whereby the desired resin was not obtained. The results are shown in Table 1.

Preparation Comparative Example 4

Preparation of Polyester Resin (A)-9

A polyethylene terephthalate resin was prepared in the same manner as in the method for producing the polyester resin (A)-1 in Preparation Example A-1 except that tetra-n-butyl titanate was used instead of the germanium dioxide, and further magnesium acetate was added. The respective additives were added so that 40 mol of phosphorus atoms, 0.1 mol of titanium atoms and 0.4 mol of magnesium atoms would be contained per ton of the resin. In this reaction system the polymerizability was poor, and even when the polycondensation reaction was carried out for 5 hours, a polymer having the prescribed intrinsic viscosity was not obtained and thus the experiment was terminated.

Preparation Comparative Example 5

Preparation of Polyester Resin (A)-10

Melt polycondensation was carried out in the same manner as in the method for producing the polyester resin (A)-1 in Preparation Example A-1 except that orthophosphoric acid was added in such an amount that 2 mol of phosphorus atoms would be contained per ton of the resin. The results are shown in Table 1.

Preparation Example B-1

Preparation of Polyester Resin (B)-1

A polyethylene terephthalate resin was prepared in the same manner as in the method for producing the above polyester resin (A)-1 in Preparation Example A-1 except that ethyl acid phosphate was used instead of orthophosphoric acid, tetra-n-butyl titanate was used instead of germanium dioxide, and magnesium acetate was added. The respective additives were added so that 0.2 mol of phosphorus atoms, 0.1 mol of titanium atoms and 0.4 mol of magnesium atoms would be contained per ton of the resin.

Then, the polyester resin pellets thus obtained were continuously supplied into an agitation crystallizer held at about 160° C. for a retention time of about 5 minutes for crystallization and dried in an inert oven ("IPHH-201 Model, manufactured by ESPEC Co.) in a nitrogen stream of 40 liter/min at 160° C. for 4 hours and then heated for solid phase polycondensation at 215° C. until the intrinsic viscosity became 0.85 dl/g to obtain a polyester resin (B)-1. The content of a cyclic trimer in the obtained polyester resin (B)-1 was measured and found to be 2,800 g per ton of the resin. Further, the volume resistivity was $18 \times 10^7$ Ω·cm.

Preparation B-2

Preparation of Polyester Resin (B)-2

A resin sample was continuously prepared by means of a continuous polycondensation apparatus as shown in FIG. 1 constituted by a slurry preparation tank composed of one agitation tank esterification reaction tanks composed of two agitation tanks connected in series and a total of three melt polycondensation reaction tanks composed of an agitation tank and the subsequent two horizontal plug flow type reaction tanks.

A slurry was prepared by supplying to the slurry preparation tank 1 an ethylene glycol solution of ethyl acid phosphate (concentration: 0.3 wt %) in such an amount that 0.48 mol of phosphorus atoms would remain per ton of the resin to be formed and terephthalic acid and ethylene glycol in a ratio of terephthalic acid:ethylene glycol=865:485 (weight ratio). This slurry was continuously supplied to the esterification reaction tanks. The reaction conditions in the esterification reaction tanks were such that the first stage 2 was carried out in a nitrogen atmosphere at 270° C. under a is relative pressure of 10 kPa (0.1 kg/cm²G) for an average retention time of 2.5 hours, and the second stage 3 was carried out likewise in the nitrogen atmosphere at 265° C. under a relative pressure of 0 kPa (0.0 kg/cm²) for an average retention time of 1.0 hour.

In the two stage esterification process, ethylene glycol was supplied through a pipe 4 provided in the second stage esterification reaction tank. In this case, the esterification rate in the esterification second stage was 95%. The esterification reaction product was continuously supplied to the melt polycondensation reactors via pipe 7. At that time, the discharge pressure of the transfer pump provided at the pipe 7 was 600 kPa, and the pressure before a control valve provided before the inlet of the melt polycondensation reactor, was 150 kPa. At intermediate points of the pipe 7, to the esterification reaction product, an ethylene glycol solution of magnesium acetate tetrahydrate (concentration 0.6 wt %) was continuously added in such an amount that 0.82 mol of magnesium atoms would remain per ton of the resin to be formed and further an ethylene glycol solution of tetra-n-butyl titanate (concentration: 0.2 wt %) was continuously added in such an amount that 0.11 mol of titanium atoms would remain per ton of the polyester resin to be formed, via pipes 5 and 6.

The reaction conditions in the melt polycondensation reactors were such that the first stage was at 266° C. under an absolute pressure of 3.25 kPa (25 Torr) for an average retention time of 0.85 hour; the second stage was at 270° C. under an absolute pressure of 0.3 kPa (2.5 Torr) for an average retention time of 0.90 hour; and the third stage was at 2720 under an absolute pressure of 0.26 kPa (1.7 Torr) for an average retention time of 0.66 hour. The melt polycondensation reaction product was extruded in the form of a strand from the die, cooled and solidified and then cut by a cutter to obtain prepolymer chips having an average weight per chip of 24 mg. The intrinsic viscosity of this chip was 0.54 dl/g.

Such prepolymer chips were continuously supplied to a crystallizer maintained in a nitrogen atmosphere and at about 160° C. and held for about 60 minutes with stirring, whereupon the chips were continuously supplied via a preheater to a tower-type solid phase polycondensation apparatus and subjected to a solid phase polycondensation reaction in a nitrogen atmosphere at 210° C. for 15 hours to obtain a polyester resin (B)-2. The content of a cyclic trimer in the obtained polyester resin (B)-2 was measured and found to be 4,500 g per ton of the resin. Further, the intrinsic viscosity was 0.67 dl/g, and the volume resistivity was $10 \times 10^7$ Ω·cm.

Preparation Example B-3

Preparation of Polyester Resin (B)-3

50 kg (260 mol) of dimethyl terephthalate and 32.3 kg (520 mol) of ethylene glycol were supplied to an ester is exchange reactor at 150° C., and as an ester exchange catalyst, magnesium acetate tetrahydrate was added in the form of an ethylene glycol solution so that 4.1 mol of magnesium atoms would be contained per ton of the resin to be obtained. Then, the temperature of the reactor was raised to 225° C. over a period of 3 hours and held at that temperature for 1 hour to complete the ester exchange reaction. This ester exchange reaction product was transferred to a polycondensation tank.

Then, ethyl acid phosphate and tetra-n-butyl titanate were added in the form of an ethylene glycol solution intermittently every five minutes to the above polycondensation tank to which the ester exchange reaction product was transferred. They were added so that 0.4 mol of phosphorus atoms and 0.4 mol of titanium atoms would be contained per ton of the resin to be obtained. Then, the interior of the reactor was heated from 225° C. to 280° C. over a period of 2 hours and 30 minutes, and at the same time, the pressure was reduced from normal pressure to 400 Pa (absolute pressure) in 85 minutes, and while the pressure was maintained at that level, melt polycondensation was carried out for a time until the intrinsic viscosity of the resin to be obtained would be 0.64 dl/g, and the resin was withdrawn in the form of a strand from the discharge outlet provided at the bottom of the polycondensation tank, cooled with ice and then formed into pellets by a cutter to obtain about 40 kg of a polyester resin.

Then, the polyester resin pellets thus obtained were continuously supplied into an agitation crystallizer held at about 160° C. for a retention time of about 5 minutes for crystallization and then dried in an inert oven ("IPHH-201 Model, manufactured by ESPEC Co.) in a nitrogen stream of 40 liter/min at 160° C. for 4 hours and then heated for solid phase polycondensation at 215° C. until the intrinsic viscosity became 0.78 dl/g to obtain a polyester resin (B)-3. The content of a cyclic trimer in the obtained polyester resin (B)-3 was measured and found to be 5,400 g per ton of the resin. Further, the volume resistivity was $5.1 \times 10^7$ Ω·cm. The physical properties of the obtained resin are shown in Table 2.

Preparation Example B-4

Preparation of Polyester Resin (B)-4

A polyester resin was prepared in the same manner as for the polyester resin (B)-1 in Preparation Example 3-1 except that magnesium acetate tetrahydrate was added in an amount of 0.1 mol as magnesium atoms per ton of the resin to be obtained.

Then, the polyester resin pellets thus obtained were continuously supplied into an agitation crystallizer held at about 160° C. for a retention time of about 5 minutes for crystallization and then dried in an inert oven ("IPHH-201 Model, manufactured by ESPEC Co.) in a nitrogen stream of 40 liter/min at 160° C. for 4 hours and then heated for solid phase polycondensation at 215° C. until the intrinsic viscosity became 0.80 dl/g to obtain a polyester resin (B)-4. The content of a cyclic trimer in the obtained polyester resin (B)-4 was measured and found to be 3,200 g per ton of the resin. Further the volume resistivity was $56 \times 10^7$ Ω·cm. The physical properties of the obtained resin are shown in Table 2.

Preparation Example B-5

Preparation of Polyester Resin (B)-5

A polyester resin (B)-1 was obtained in the same manner as in Preparation Example B-1 except that in the method for producing the polyester resin (B)-1 in Preparation Example B-1, no magnesium acetate tetrahydrate was added, and orthophosphoric acid and tetra-n-butyl titanate were added so that 0.2 mol of phosphorus atoms and 0.12 mol of titanium atoms would be contained per ton of the resin to be obtained. The content of a cyclic trimer in the obtained polyester resin (B)-5 was measured and found to be 2,800 g per ton of the resin. Further, the volume resistivity was $150 \times 10^7$ Ω·cm. The physical properties of the obtained resin are shown in Table 2.

Example 1

Preparation of Polyester Resin Composition (C)

Pellets of the polyester resins (A)-1 and (B)-1 obtained in Preparation Examples A-1 and B-1 were mixed uniformly at a weight ratio [(A)/(B)] of 0.05 to obtain a polyester resin blend. The content of a cyclic trimer (CT1) in the obtained blend was measured.

Then the polyester resin blend was subjected to melt-kneading for 20 minutes in a Labo plastomill ("20C200 Model" manufactured by Toyo Seiki Seisaku-sho, LTD.) set at 285° C. at a rotational speed of 50 rpm to obtain a polyester resin composition (C). The content of a cyclic trimer (CT2) in the obtained composition (C) was quantified. In the composition (C), the increase in the content of the cyclic trimer between before and after the melt-kneading of the blend [(CT2)−(CT1)] was 300 g per ton of the resin. Further, evaluation of a biaxially stretched film was carried out to measure the number of protrusions (FE) as observed on the film. Further, the volume resistivity was measured. The results are shown in Table 3.

Comparative Example 1

Without blending the polyester resin (A)-1, only the polyester resin (B)-1 obtained in Preparation Example B-1 was subjected to melt-kneading by a Labo Plastomill under the same conditions as in Example 1, and the content of a cyclic trimer (CT2) in the obtained resin was quantified. Further, evaluation of the film was also carried out.

The results are shown in Table 3.

Examples 2 and 3 and Comparative Example 2

A polyester resin blend was prepared in the same manner as in Example 1 except that the weight ratio of is the polyester resin (A)-1 to the polyester resin (B)-1 was changed as shown in Table 1 and subjected to melt-kneading to obtain a polyester resin composition (C). Further, in the same manner as in Example 1, the contents of a cyclic trimer (CT1 and CT2) were quantified and the evaluation of the film and the measurement of the volume resistivity were carried out. The results are shown in Table 3.

Example 4

A polyester resin composition (C) was obtained by carrying out the melt-kneading in the same manner as in Example 1 except that in Example 1, the polyester resin (A)-2 was used instead of the polyester resin (A)-1. Further, in the same manner as in Example 1, the contents of a cyclic trimer (CT1 and CT2) were quantified, and the evaluation of the film and the measurement of the volume resistivity were carried out. The results are shown in Table 3.

Example 5

A polyester resin composition (C) was obtained by carrying out the melt-kneading in the same manner as in Example 1 except that in Example 1, the polyester resin (A)-3 was used instead of the polyester resin (A)-1. Further, in the same manner as in Example 1, the contents of a cyclic trimer (CT1 and CT2) were quantified, and the evaluation of the film and the measurement of the volume resistivity were carried out. The results are shown in Table 3.

Example 6

A polyester resin composition (C) was obtained by carrying out the melt-kneading in the same manner as in Example 1 except that in Example 1, the polyester resin (A)-4 was used instead of the polyester resin (A)-1. Further, in the same manner as in Example 1, the contents of a cyclic trimer (CT1 and CT2) were quantified, and the evaluation of the film and the measurement of the volume resistivity were carried out. The results are shown in Table 3

Example 7

A polyester resin composition (C) was obtained by carrying out the melt-kneading in the same manner as in Example 1 except that in Example 1, the polyester resin (B)-2 was used instead of the polyester resin (B)-1. Further, in the same manner as in Example 1, the contents of a cyclic trimer (CT1 and CT2) were quantified, and the evaluation of the film and the measurement of the volume resistivity were carried out. The results are shown in Table 3.

Example 8

A polyester resin composition (C) was obtained by carrying out the melt-kneading in the same manner as in Example 1 except that in Example 1, the polyester resin (B)-3 was used instead of the polyester resin (B)-1. Further, in the same manner as in Example 1, the contents of a cyclic trimer (CT1 and CT2) were quantified, and the evaluation of the film and the measurement of the volume resistivity were carried out. The results are shown in Table 3.

Example 9

A polyester resin composition (C) was obtained by carrying out the melt-kneading in the same manner as in Example 1 except that in Example 1, the polyester resin (B)-4 was used instead of the polyester resin (B)-1. Further, in the same manner as in Example 1, the contents of a cyclic trimer (CT1 and CT2) were quantified, and the evaluation of the film and the measurement of the volume resistivity were carried out. The results are shown in Table 3.

Example 10

A polyester resin composition (C) was obtained by carrying out the melt-kneading in the same manner as in Example 1 except that in Example 1, the polyester resin (B)-5 was used instead of the polyester resin (B)-1. Further, in the same manner as in Example 1, the contents of a cyclic trimer (CT1 and CT2) were quantified, and the evaluation of the film and the measurement of the volume resistivity were carried out. The results are shown in Table 3.

Comparative Example 3

A polyester resin composition (C) was obtained by carrying out the melt-kneading in the same manner as in Example 1 except that in Example 1, the polyester resin (A)-10 was used instead of the polyester resin (A)-1. Further, in the same manner as in Example 1, the contents of a cyclic trimer (CT1 and CT2) were quantified and the evaluation of the film and the measurement of the volume resistivity were carried out. The results are shown in Table 3. In this Example, a substantial increase in CT after the melt kneading was observed.

Comparative Example 4

A polyester resin composition (C) was obtained in the same manner as in Example 1 except that in Example 1, the polyester resin (A)-5 obtained in Preparation Comparative Example A-1 was used instead of the polyester resin (A)-1, and the weight ratio thereof to the polyester resin (B)-1 [(A)/(B)] was changed to 0.25. Further, in the same manner as in Example 1, the contents of a cyclic trimer (CT1 and CT2) were quantified, and the evaluation of the film and the measurement of the volume resistivity were carried out. The results are shown in Table 3.

Comparative Example 5

A polyester resin composition (C) was obtained in the same manner as in Example 1 except that in Example 1, the polyester resin (A)-6 obtained in Preparation Comparative Example A-2 was used as the polyester resin (A)-1, and the weight ratio [(A)/(B)] was changed to 0.05. Further, in the same manner as in Example 1, the contents of a cyclic trimer (CT1 and CT2) were quantified, and the evaluation of the film and the measurement of the volume resistivity were carried out. The results are shown in Table 3.

TABLE 1

| | | Polyester resin (A) | | | | | | Physical property value | | | |
| | | Bivalent metal | | Phosphorus compound | | | | | Number of foreign matters | | |
| | No. | Type | Amount (mol/T) | Compound | Amount (mol/T) | Polymerization catalyst | Amount (mol/T) | Gel/P1 (mol/mol) | Color Co-b | 0.1-0.2 (mm) | 0.2-0.3 (mm) | 0.3< (mm) |
| Preparation Example A-1 | 1 | Nil | — | $H_3PO_4$ | 40 | Ge | 0.5 | 0.0125 | 1.8 | 0 | 0 | 0 |
| Preparation Example A-2 | 2 | Nil | — | PO | 40 | Ge | 0.5 | 0.0125 | 2 | 1 | 0 | 0 |

TABLE 1-continued

| | | Polyester resin (A) | | | | | | | Physical property value | | | |
| | | Bivalent metal | | Phosphorus compound | | Polymerization catalyst | | | | Number of foreign matters | | |
| | No. | Type | Amount (mol/T) | Compound | Amount (mol/T) | | Amount (mol/T) | Ge1/P1 (mol/mol) | Color Co-b | 0.1-0.2 (mm) | 0.2-0.3 (mm) | 0.3< (mm) |
|---|---|---|---|---|---|---|---|---|---|---|---|---|
| Preparation Example A-3 | 3 | Nil | — | ET | 40 | Ge | 0.5 | 0.0125 | 1.9 | 0 | 0 | 0 |
| Preparation Example A-4 | 4 | Mg | 4.1 | $H_3PO_4$ | 35.5 | Ge | 0.6 | 0.0169 | 0.9 | 0 | 0 | 0 |
| Preparation Comparative Example 1 | 5 | Mn | 2.1 | TMP | 13 | Sb | 1.6 | — | 2.3 | 2 | 0 | 1 |
| Preparation Comparative Example 2 | 6 | Mn | 2.1 | TMP | 40 | Sb | 1.6 | — | 0.9 | 2 | 0 | 1 |
| Preparation Example A-5 | 7 | Nil | — | $H_3PO_4$ | 12 | Ge | 1.5 | 0.1250 | 5.3 | 0 | 0 | 0 |
| Preparation Comparative Example 3 | 8 | Nil | — | $H_3PO_4$ | 40 | Ge | 0.18 | 0.0045 | NP | Not measured | | |
| Preparation Comparative Example 4 | 9 | Mg | 0.4 | $H_3PO_4$ | 40 | Ti | 0.1 | — | NP | Not measured | | |
| Preparation Comparative Example 5 | 10 | Nil | — | $H_3PO_4$ | 2 | Ge | 1 | 0.5000 | 1.7 | 0 | 0 | 0 |

T: Ton of the resin,
TMP: Trimethyl phosphate,
PO: Polyphosphoric acid,
ET: Ethyl acid phosphate,
NP: Not polymerized

TABLE 2

| | | Polyester resin (B) | | | | | | | | | | |
| | | Bivalent metal | | Phosphorus compound (P2) | | Polymerization catalyst | | | Physical property value | | | |
| | No | Type | Amount (mol/T) | Compound | Amount (mol/T) | Type | Amount (mol/T) | P2/Ti (mol/mol) | Intrinsic viscosity (dl/g) | Color Co-b | Cyclic trimer (g/T) | Volume resistivity (×$10^7$ Ωcm) |
|---|---|---|---|---|---|---|---|---|---|---|---|---|
| Preparation Example B-1 | 1 | Mg | 0.4 | $H_3PO_4$ | 0.2 | Ti | 0.1 | 2.0 | 0.85 | 3.2 | 2800 | 18 |
| Preparation Example B-2 | 2 | Mg | 0.82 | EAP | 0.48 | Ti | 0.11 | 4.4 | 0.67 | 2.1 | 4500 | 10 |
| Preparation Example B-3 | 3 | Mg | 4.1 | EAP | 0.4 | Ti | 0.4 | 1.0 | 0.78 | 3.1 | 5400 | 5.1 |
| Preparation Example B-4 | 4 | Mg | 0.1 | EAP | 0.2 | Ti | 0.1 | 2.0 | 0.8 | 1.9 | 3200 | 56 |
| Preparation Example B-5 | 5 | Nil | — | $H_3PO_4$ | 0.2 | Ti | 0.12 | 1.7 | 0.85 | 5.4 | 2800 | 150 |

EPA: Ethyl acid phosphate,
T: Ton of the resin

TABLE 3

| | Polyester resin | | Blend ratio | | X | Y | Y − X | FE evaluation | | | Volume resistivity (×$10^7$ Ωcm) |
| | (A) | (B) | (A)/(B) | P3/Ti2 | CT1 (g/T) | CT2 (g/T) | CT2 − CT1 (g/T) | Number of protrusions | | Judgment | |
| | | | | | | | | At least 0.27 μm | At most 0.54 μm | | |
|---|---|---|---|---|---|---|---|---|---|---|---|
| Ex. 1 | 1 | 1 | 0.05 | 23 | 3200 | 3500 | 300 | 42 | 8 | ○ | 24 |
| Comp. Ex. 1 | Nil | 1 | — | — | 2800 | 7000 | 4200 | 24 | 6 | ○ | 18 |
| Ex. 2 | 1 | 1 | 0.11 | 46 | 3500 | 3700 | 200 | 38 | 8 | ○ | 23 |

TABLE 3-continued

| | Polyester resin | | Blend ratio | | X CT1 | Y CT2 | Y − X CT2 − CT1 | FE evaluation Number of protrusions | | | Volume resistivity |
|---|---|---|---|---|---|---|---|---|---|---|---|
| | | | | | | | | At least 0.27 μm | At most 0.54 μm | | |
| | (A) | (B) | (A)/(B) | P3/Ti2 | (g/T) | (g/T) | (g/T) | | | Judgment | (×10$^7$ Ωcm) |
| Ex. 3 | 1 | 1 | 0.01 | 6 | 2900 | 4500 | 1600 | 28 | 8 | ○ | 25 |
| Comp. Ex. 2 | 1 | 1 | 0.0001 | 2.4 | 2800 | 6000 | 3200 | 36 | 6 | ○ | 22 |
| Ex. 4 | 2 | 1 | 0.05 | 23 | 3200 | 3800 | 600 | 76 | 10 | Δ | 20 |
| Ex. 5 | 3 | 1 | 0.05 | 23 | 3200 | 3800 | 600 | 32 | 6 | ○ | 25 |
| Ex. 6 | 4 | 1 | 0.05 | 21 | 3400 | 3700 | 300 | 84 | 12 | Δ | 22 |
| Ex. 7 | 1 | 2 | 0.05 | 24 | 4800 | 5000 | 200 | 24 | 8 | ○ | 22 |
| Ex. 8 | 1 | 3 | 0.05 | 6.2 | 5700 | 6800 | 1000 | 36 | 10 | ○ | 12 |
| Ex. 9 | 1 | 4 | 0.05 | 23 | 3500 | 3700 | 200 | 34 | 8 | ○ | 72 |
| Ex. 10 | 1 | 5 | 0.05 | 19 | 3100 | 3500 | 400 | 34 | 10 | ○ | 140 |
| Comp. Ex. 3 | 10 | 1 | 0.05 | 3.1 | 3200 | 6200 | 3000 | 48 | 8 | ○ | 20 |
| Comp. Ex. 4 | 5 | 1 | 0.25 | 34 | 4200 | 4500 | 300 | 142 | 24 | X | 7.5 |
| Comp. Ex. 5 | 6 | 1 | 0.05 | 23 | 3200 | 3500 | 300 | At least 1000 | 34 | X | 16 |

FE evaluation: Evaluation of the number of protrusions on the surface of a biaxially stretched film

INDUSTRIAL APPLICABILITY

By the present invention, a polyester resin composition will be provided which presents little soiling or the like during the molding, whereby it becomes possible to produce a molded product such as a film, sheet or bottle having good quality with little content of foreign matters.

The entire disclosure of Japanese Patent Application No. 2004-360484 filed on Dec. 13, 2004 including specification, claims, drawings and summary is incorporated herein by reference in its entirety.

The invention claimed is:

1. A method for producing a polyester resin composition (C), the method comprising: melt-kneading a polyester resin (A) comprising phosphorus atoms and germanium atoms to satisfy the following formulae (1), (2) and (3), and a polyester resin (B) comprising titanium atoms to satisfy the following formula (4):

$$P1 \geq 10 \quad (1)$$

$$0.1 \leq Ge1 \leq 1.5 \quad (2)$$

$$0.001 \leq Ge1/P1 \leq 0.15 \quad (3)$$

$$0 \leq P2/Ti1 \leq 80 \quad (4)$$

wherein in the formulae (1), (2) and (3), P1 is a mole content of the phosphorus atoms and Ge1 is a mole content of the germanium atoms, per ton of the polyester resin (A), and in the formula (4), P2 is a mole content of the phosphorus atoms and Ti1 is a mole content of the titanium atoms, per ton of the polyester resin (B), so that the polyester resin composition (C) satisfies the following formula (6):

$$(P3/Ti2) \geq 5 \quad (6),$$

wherein P3 is a mole content of phosphorus atoms and Ti2 is a mole content of titanium atoms, per ton of the composition (C), wherein the total amount of a phosphorus compound having the mole content P1 is added to the polyester resin (A) at the time of a polycondensation, at least 95 mol % of a diol component in both of the polyester resins (A) and (B) is ethylene glycol, wherein the phosphorus compound is at least one selected from the group consisting of orthophosphoric acid, polyphosphoric acid and ethyl acid phosphate, wherein in the polyester resin (A), only the germanium compound is used as a polycondensation catalyst, and the polyester resin (B) does not comprise a germanium compound, wherein the phosphorous atoms are from the phosphorus compound, wherein the germanium and titanium atoms are from germanium and titanium catalysts, respectively and wherein the germanium catalyst is at least one catalyst selected from the group consisting of germanium dioxide, germanium tetraoxide and germanium hydroxide.

2. The method for producing a polyester resin composition (C) according to claim 1, wherein the content of the titanium atoms in the polyester resin (B) is from 0.002 mol to 1 mol per ton of the resin.

3. The method for producing a polyester resin composition (C) according to claim 1 or 2, wherein the content of a cyclic trimer in the polyester resin (B) is at most 8,000 g per ton of the resin.

4. The method for producing a polyester resin composition (C) according to claim 1, wherein the polyester resin (B) has a volume resistivity of at most 50×10$^7$ Ωcm.

5. The method for producing a polyester resin composition (C) according to claim 1, wherein the phosphorus atoms contained in the polyester resin (A) are ones derived from a pentavalent phosphorus compound used in the production of the polyester resin (A).

6. The method for producing a polyester resin composition (C) according to claim 1, wherein the weight ratio of the polyester resin (A) to the polyester resin (B) satisfies the following formula (5):

$$0 < \text{polyester resin } (A)/\text{polyester resin } (B) \leq 0.5 \quad (5).$$

7. The method for producing a polyester resin composition (C) according to claim 1, wherein the number of foreign matters having sizes of at least 0.1 mm contained in the polyester resin (A) is at most 1 per 50 g of the polyester resin, and no foreign matter having a size of at least 0.3 mm is contained.

8. The method for producing a polyester resin composition (C) according to claim 1, wherein a film formed from the polyester resin composition (C) has protrusions having heights of at least 0.27 µm at a rate of at most 100 protrusions/10 cm² and protrusions having heights of at least 0.54 µm at a rate of at most 30 protrusions/10 cm², on the film surface.

9. A method for producing a polyester resin composition (C), the method comprising: melt-kneading a polyester resin (A) comprising a phosphorus compound and a polycondensation catalyst which is a germanium compound, to satisfy the following formulae (1), (2) and (3), and a polyester resin (B) comprising a titanium compound to satisfy the following formula (4):

$$P1 \geq 10 \qquad (1)$$

$$0.1 \leq Ge1 \leq 1.5 \qquad (2)$$

$$0.001 \leq Ge1/P1 \leq 0.15 \qquad (3)$$

$$0 \leq P2/Ti1 \leq 80 \qquad (4),$$

wherein in the formulae (1), (2) and (3), P1 is a mole content of phosphorus atoms and Ge1 is a mole content of germanium atoms, per ton of the polyester resin (A), and in the formula (4), P2 is a mole content of phosphorus atoms and Ti1 is a mole content of titanium atoms, per ton of the polyester resin (B), so that the polyester resin composition (C) satisfies the following formula (6):

$$(P3/Ti2) \geq 5 \qquad (6),$$

wherein P3 is a mole content of phosphorus atoms and Ti2 is a mole content of titanium atoms, per ton of the composition (C), wherein the total amount of the phosphorus compound having the mole content P1 is added to the polyester resin (A) at the time of a polycondensation, wherein at least 95 mol % of a diol component in both of the polyester resins (A) and (B) is ethylene glycol, and wherein the phosphorus compound is at least one selected from the group consisting of orthophosphoric acid, polyphosphoric acid and ethyl acid phosphate, wherein in the polyester resin (A), only the germanium compound is used as the polycondensation catalyst, and the polyester resin (B) does not comprise a germanium compound, wherein the phosphorous atoms are from the phosphorus compound, wherein the germanium and titanium atoms are from germanium and titanium catalysts, respectively and wherein the germanium catalyst is at least one catalyst selected from the group consisting of germanium dioxide, germanium tetraoxide and germanium hydroxide.

10. The method for producing a polyester resin composition (C) according to claim 9, wherein the content of the titanium atoms in the polyester resin (B) is from 0.002 mol to 1 mol per ton of the resin.

11. The method for producing a polyester resin composition (C) according to claim 9, wherein the content of a cyclic trimer in the polyester resin (B) is at most 8,000 g per ton of the resin.

12. The method for producing a polyester resin composition (C) according to claim 9, wherein the polyester resin (B) has a volume resistivity of at most $50 \times 10^7$ Ωcm.

13. The method for producing a polyester resin composition (C) according to claim 9, wherein the phosphorus atoms contained in the polyester resin (A) are ones derived from a pentavalent phosphorus compound used in the production of the polyester resin (A).

14. The method for producing a polyester resin composition (C) according to claim 9, wherein the weight ratio of the polyester resin (A) to the polyester resin (B) satisfies the following formula (5):

$$0 < \text{polyester resin }(A)/\text{polyester resin }(B) \leq 0.5 \qquad (5).$$

15. The method for producing a polyester resin composition (C) according to claim 9, wherein the number of foreign matters having sizes of at least 0.1 mm contained in the polyester resin (A) is at most 1 per 50 g of the polyester resin, and no foreign matter having a size of at least 0.3 mm is contained.

16. The method for producing a polyester resin composition (C) according to claim 9, wherein a film formed from the polyester resin composition (C) has protrusions having heights of at least 0.27 µm at a rate of at most 100 protrusions/10 cm² and protrusions having heights of at least 0.54 µm at a rate of at most 30 protrusions/10 cm², on the film surface.

* * * * *